United States Patent
Diamond et al.

[19]

[11] Patent Number: 5,804,237
[45] Date of Patent: Sep. 8, 1998

[54] METHOD OF AND PACKAGE FOR STERILIZED EDIBLE MATERIAL

[75] Inventors: George B. Diamond, 62 Anthony Rd., Glen Gardner, N.J. 08826; Ray G. Slocum, Washington, N.J.

[73] Assignee: George B. Diamond, Glen Gardner, N.J.

Related U.S. Application Data

[60] Provisional application No. 60/005,292 Oct. 16, 1995.

[21] Appl. No.: 729,812

[22] Filed: Oct. 8, 1996

[51] Int. Cl.[6] .......................... B65B 31/02; B65B 55/06; B65B 55/08; B65B 55/14
[52] U.S. Cl. ......................... 426/131; 426/87; 426/111; 426/399; 426/407; 426/234; 220/609; 220/624; 53/432; 53/440
[58] Field of Search ..................................... 426/407, 131, 426/399–401, 397, 111, 87, 234; 53/440, 432; 220/609, 624, 608

[56] References Cited

U.S. PATENT DOCUMENTS

| | | | |
|---|---|---|---|
| 1,499,239 | 6/1924 | Malmquist | 220/624 |
| 2,027,430 | 1/1936 | Hansen | 220/624 |
| 2,894,844 | 7/1959 | Shakman | 220/609 |
| 2,971,671 | 2/1961 | Shakman | 220/609 |
| 3,400,853 | 9/1968 | Jacobsen | 426/131 |
| 3,704,140 | 11/1972 | Petit et al. | 426/401 |
| 3,736,899 | 6/1973 | Manske | 220/624 |
| 3,814,279 | 6/1974 | Rayzal | 220/624 |
| 4,010,867 | 3/1977 | Jones | 220/608 |
| 4,458,469 | 7/1984 | Dunn | 53/440 |
| 4,680,917 | 7/1987 | Hambleton et al. | 53/440 |
| 4,696,580 | 9/1987 | Kameda | 426/407 |
| 4,703,609 | 11/1987 | Yoshida et al. | 53/432 |
| 4,967,538 | 11/1990 | Leftault et al. | 53/440 |
| 5,033,254 | 7/1991 | Zenger | 53/432 |
| 5,251,424 | 10/1993 | Zenger et al. | 53/432 |
| 5,344,662 | 9/1994 | Payn et al. | 426/131 |

FOREIGN PATENT DOCUMENTS

| | | | |
|---|---|---|---|
| 727465 | 2/1966 | Canada | 53/432 |
| 521642 | 1/1993 | European Pat. Off. | 53/432 |
| 60-43370 | 3/1985 | Japan | 426/397 |
| 1221069 | 3/1986 | U.S.S.R. | 426/131 |
| 1455652 | 11/1976 | United Kingdom | 426/131 |
| 2089191 | 6/1982 | United Kingdom | 426/131 |

*Primary Examiner*—Steven Weinstein
*Attorney, Agent, or Firm*—Ostrolenk, Faber, Gerb & Soffen, LLP

[57] ABSTRACT

A thin walled, easily crushable container with an integral or seamed-on bottom is filled with an edible material which requires sterilization. The empty container has one end attached or integral that may have a concave slope relative to the inside of the container. A liquified or solidified inert gas is then inserted into the container. The container is then sealed with a concave shaped end before the inert liquified or solidified gas has completely vaporized. The ends are such that they do not bulge under the pressure left after sterilization, which pressure is due to the pressurization effect of the inert gas and which pressure is enough to overcome the vacuum caused by the cooling of hot water vapor or steam above the edible material and gives the can the required rigidity. If one end is concave shaped and will invert or bulge at bacterial gas pressure but not at the gas pressure left after sterilization, then the other end does not necessarily have to be concave as long as it does not bulge at the pressure left after sterilization.

21 Claims, 2 Drawing Sheets

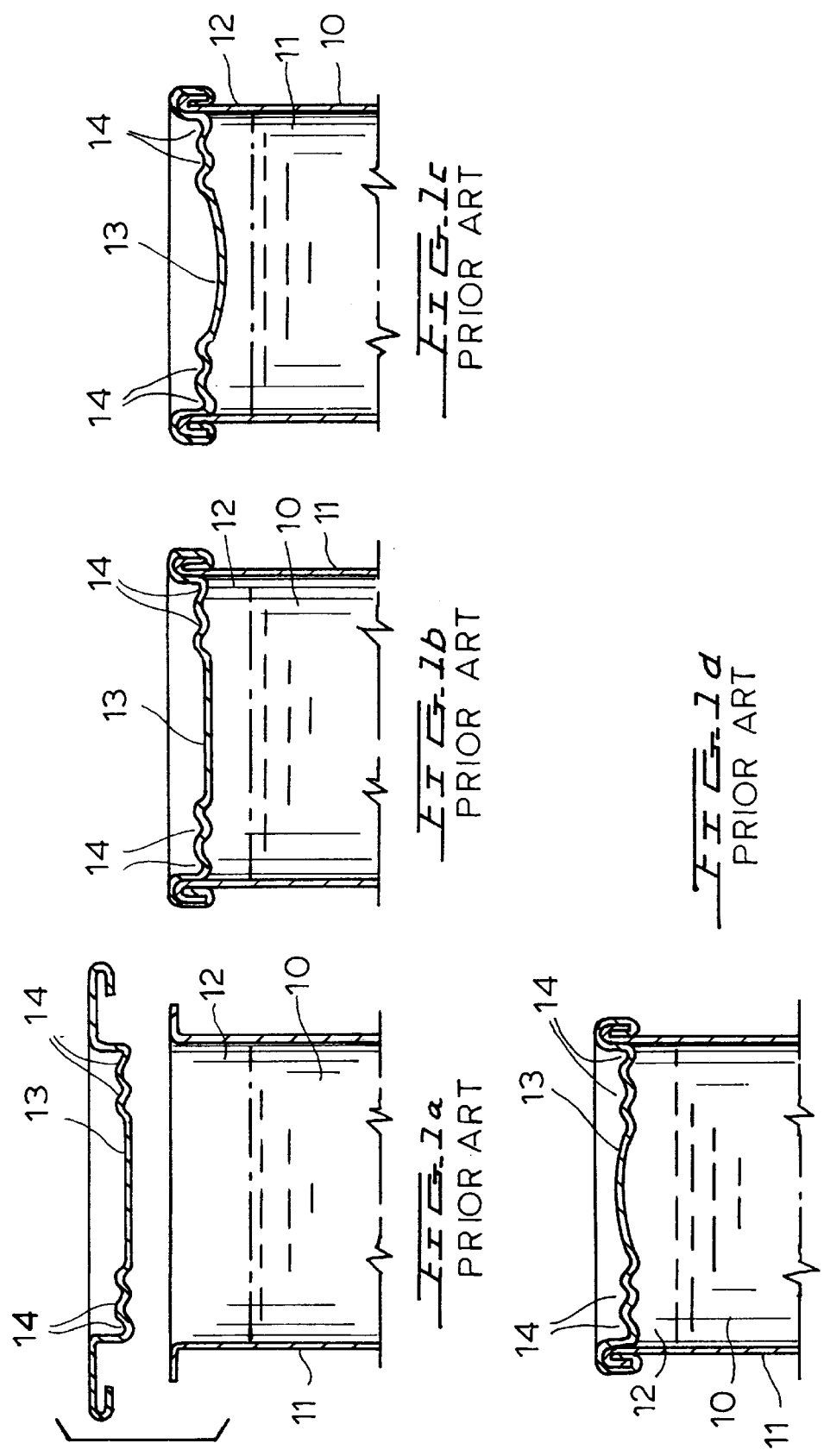

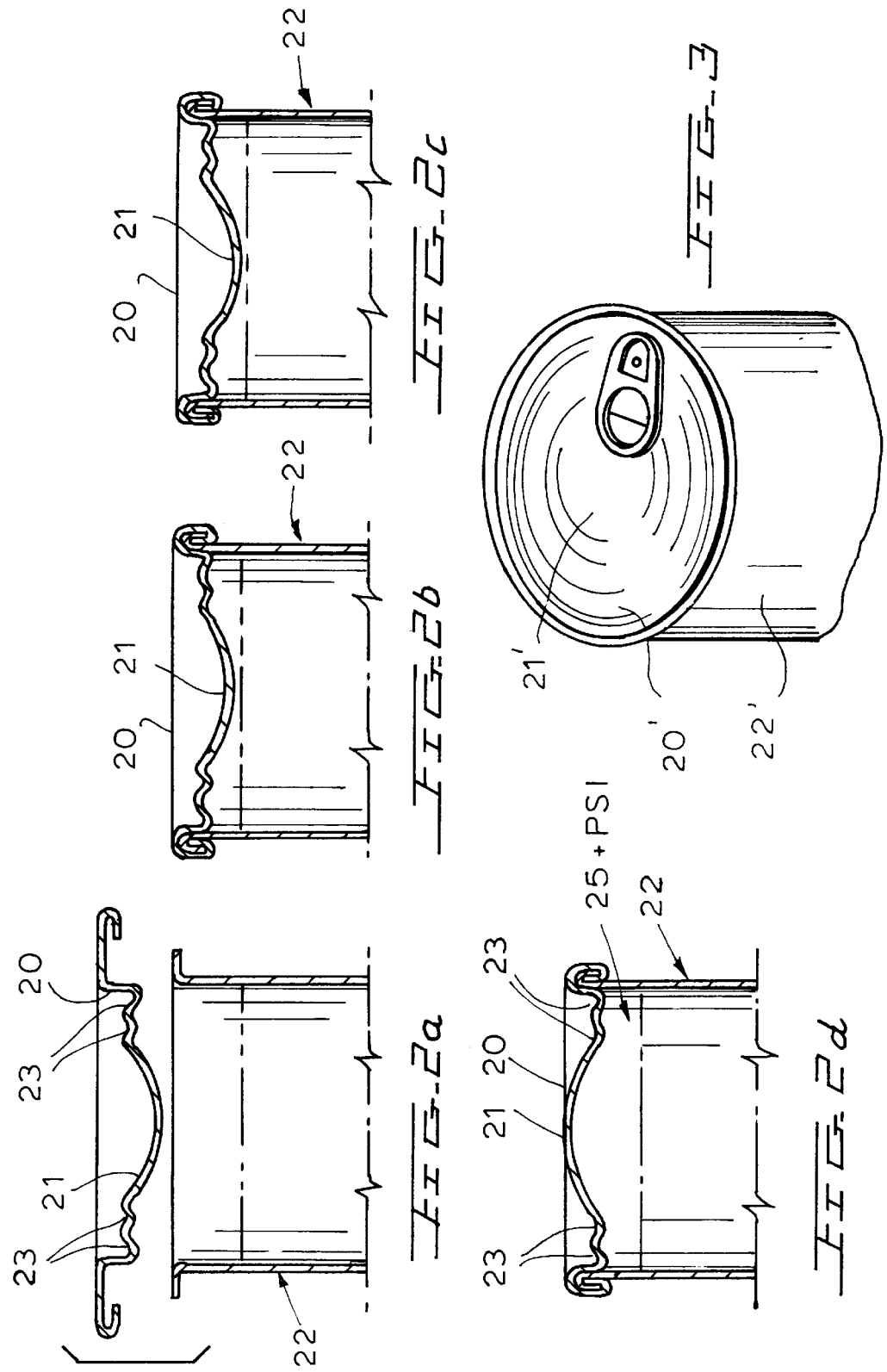

METHOD OF AND PACKAGE FOR STERILIZED EDIBLE MATERIAL

CROSS-REFERENCE TO RELATED APPLICATIONS

This application is based upon provisional application U.S. Ser. No. 60/005,292, filed Oct. 16, 1995 and entitled "A COVER FOR AUTOCLAVABLE FOOD CONTAINERS".

BACKGROUND OF THE INVENTION

This invention relates to the packaging of sterilized edible materials and, in particular, to the packaging of heat processable, e.g., autoclavable, edible materials, such as food, using thin wall containers. As used herein the term "sterilized" or "sterilizable" material means a material that has been or will be subject to a sterilization process, such as heat processing, aseptic processing, ohmic or radiation processing, et cetera.

Food containers, such as cans are used for both foods which require sterilization (usually by autoclaves) such as low acid, and/or low sugar foods and for foods which do not support bacterial growth, such as high acid foods and high sugar content foods that, therefore, do not require sterilization. High acid and/or high sugar content foods need only to be heated to approximately 180° F. (82.2° C.) for a period of time to kill the yeasts and molds and then they can be canned.

Foods that support bacterial growth, i.e., foods not high in acid content and/or sugar content, require sterilization after they are sealed in a container or during processing, such as aseptic filling. The conditions and degree of sterilization are controlled by various government regulations.

When a food can (usually steel or aluminum) is filled, it is desirable to remove the air above the liquid in order to preserve flavor and diminish can corrosion and permit a reasonable vacuum to form in the can after cooling.

Referring to FIGS. 1(a) to 1(d), the conventional method of packaging and sterilizing food products in cans is as follows:

The food 10 is processed according to the recipe; it may be cooked or it may not be cooked. It is then inserted into a can 11. A space 12 of about ⅛"–⅜" (3.18 nm–9.53 nm) from the top edge of the can 11 is left empty. The can 11 then goes to a seamer; if the food is cold (room temperature) steam is added just before the end 13 is seamed to the can 11; if the food is hot, steam may or may not be added before seaming. The added steam or the hot water vapors or a combination of both displaces much of the air and the seamed can 11 now goes into a sterilizer (autoclave) where it is exposed to steam under pressure or to other forms of heating. If other forms of heating are used, external air pressure is usually applied so that there is no bulging of the end during heating or cooling. Depending on the government requirements, the temperature is raised to about 250° F. (121° C.) and maintained there for the required period of time. Higher temperatures and shorter times are used for aseptic filling.

The pressure in the can increases to the equilibrium pressure of water at the specified temperature, approximately 15 psig (1.03 bar) at 250° F. (121° C.), for example. As seen in FIG. 1(b), the external pressure due to the heating steam or air pressure balances the internal pressure, so that the end does not substantially bulge. External pressure is not necessary in the case of aseptic or radiation packaging. The can then goes to a cooling tunnel or remains in the autoclave where it is cooled with water or air and an external air pressure is maintained until the can reaches substantially room temperature. The external air pressure is necessary because the interior of the can is still very hot and would bulge the end (due to the equilibrium pressure of the hot water/steam). The cooled can is now sent to inspection, labeling, packaging and storage.

The can is now under vacuum due to the condensation of the water vapor/steam above the surface of the contents. The vacuum can range from less than one inch (25.4 mm) of mercury to about 10–20 inches (254 mm –508 mm) of mercury), depending on the temperature of the contents before seaming and on other variables. A higher vacuum indicates that more of the air has been removed, so that vacuums of 10–20 inches (254 mm–508 mm) of mercury are desired. Higher or lower vacuums can be used if necessary. In many cases, as seen in FIG. 1(c), the vacuum also causes the end to become concave. This is desirable since, as seen in FIG. 1(d), bacterial action develops gases which exert pressure and make the end 13 convex. A convex end 13 indicates a spoiled and therefore dangerous can and will be rejected at the plant (after the necessary incubation time) or at the store or by the customer who has been educated for many years to reject bulging cans.

Since the can 11 is under vacuum, it tends to collapse unless the walls are over 5/1000" (0.127 mm) thick and sometimes up to 11/1000" (0.279 mm) in thickness. To further strengthen the wall of the can 11, it is usually beaded during manufacture. The ends 13 are made as thin as possible, consistent with maintaining seam strength and buckling characteristics. In order to improve the strength of the end 13, it may include one or more stiffening beads 14.

Aseptic canned foods generally also follow the above procedure, except that they are processed at much higher temperatures for shorter times and put into pre-sterilized cans and ends. Since they are not heated after being seamed, external pressure is not necessary.

It would be economically and environmentally very advantageous if thin walled cans about 2–5 thousandths of an inch (0.051–0.127 mm) thick could be used for autoclaved and aseptically canned foods. Indeed, they are now used for high acid foods and high sugar foods, such as fruit and juices, such as tomato juice, fruit nectar, etc. These foods do not require sterilization but only pasteurization since they do not support bacterial growth, only mold and yeast growth which are killed at pasteurization temperatures.

In packaging of such containers, a drop of liquid nitrogen or of liquid carbon dioxide or a flake of solid carbon dioxide is put in the can before seaming. The drop or flake evaporates and gives sufficient pressure after seaming to keep the can rigid. In the case of soft drinks, the carbon dioxide in the drink keeps the cans rigid. High acid or high sugar products as described above do not need autoclaving. They are merely hot filled and/or pasteurized. Although the tops (top ends) of these cans are convex due to the internal gas pressure, the public understands that this type of product as opposed to canned vegetables, soups, meats, fish, etc. can have convex top ends.

Since the cans are thin walled, they are not rigid and must be pressurized to give them rigidity. As soon as the cans are opened, they lose their rigidity, which is not deleterious since they are usually discarded immediately or soon after being opened. This differentiates these cans from aerosol cans, such as those in U.S. Pat. No. 5,211,317, which stay rigid throughout their use and until the residual propellant pressure is released.

These thin walled cans which are used for foods which are not autoclaved are filled hot or cold and then a small amount of liquid nitrogen (or, in some cases, liquid or solid carbon dioxide) is put into the can. If filled cold, they are usually pasteurized after the end is seamed on. The drop of liquid nitrogen evaporates—removing the air—and the end is sealed on before the drop has completely evaporated, leaving a pressure in the can of approximately 10 psig to 20 psig (0.69 bars–1.38 bars). Higher or lower pressures can also be used. This pressure gives the can rigidity so that it can be shipped, stored and handled in stores and in the home. This pressure is not critical as long as it gives the can rigidity. The pressure can vary depending on the wall thickness, the type of products and other factors. The top end of this can is not concave, it is convex. Nevertheless, the store personnel and the public understand that such cans are not spoiled and the government recognizes that products in these cans are exempt from certain sterilization requirements. The bottom end of this can is usually concave, since the same can is used for much higher pressure soft drinks or beer. The bottom ends integral (or seamed on) of beverage cans have to resist pressures of about 60 to 120 psig which can be generated by soft drinks and beer. Cans usable in the present invention can have thinner bottoms than beverage cans and are, therefore, even more economical and environmentally friendly than presently used beverage cans.

As noted above, it would be economically and environmentally very advantageous if thin walled beverage type containers could be used for sterilized products. Accordingly, it is an object of the present invention to provide a package and packaging method for products that require sterilization using thin wall containers.

SUMMARY OF THE INVENTION

In accordance with the present invention, the foregoing and other objects are achieved by a package for packaging a sterilized edible material which includes a thin wall container containing a sterilized edible material and an inert gas under pressure. The walls of the container are maintained rigid by the pressure of the inert gas but are easily deformable in the absence of such pressure. The container has a top end and a bottom end with at least one end having a concave slope relative to the inside of the container, such at least one end being of a material, a thickness and shape such that the end retains a substantially concave slope after sterilization but becomes convex if there is any gas pressure due to bacterial action in the container.

In accordance with a packaging method according to the invention, a predetermined amount of an inert liquified or solidified gas, such as liquid nitrogen or carbon dioxide, is inserted into the container prior to sealing. Preferably, the amount of gas is sufficient to balance the vacuum created by the sterilization process, plus an additional amount to create an additional pressure to maintain the package under pressure and, therefore, rigid after sterilization but is less than that which would make the end flat or convex.

An end for sealing a container According to the invention may include a top side, a bottom side and a slope having a concavity as viewed for the top side.

Other features and advantages of the present invention will become apparent from the following description of the invention which refers to the accompanying drawings.

BRIEF DESCRIPTION OF THE DRAWING(S)

FIGS. 1(a)–1(d) illustrate a conventional method of packaging a processed material.

FIGS. 2(a)–2(d) illustrate a method of packaging heat processed material in accordance with the present invention.

FIG. 3 illustrates an easy-open end embodying certain principles of the invention.

DETAILED DESCRIPTION OF THE PREFERRED EMBODIMENT(S)

I have invented a method of using thin walled cans for foods which are autoclaved or otherwise sterile filled. The method has advantages other than the economical and environmental ones described below.

Referring now to FIGS. 2(a)–2(d) and, mote particularly, to FIG. 2(a), I use an end 20 which is manufactured with a concave surface 21 and I pressurize the can 22 (hot or cold filled) with liquid nitrogen (or liquid or solid carbon dioxide) using standard known technology, except that I use more liquid nitrogen or liquid or solid carbon dioxide than is conventional for pasteurized products, so that the can remains under pressure after the autoclaving and cooling. Other inert liquefied gasses can be used but are usually more expensive.

If the normal created vacuum after seaming is 15 inches (381 mm) of mercury which is equivalent to minus 7.25 psig. (minus 0.5 bar) of pressure, then I use enough liquid nitrogen to generate 7.25 lbs/sq.in. (0.5 bar) plus about 10–20 lbs/sq.in. (0.69–1.38 bar) additional, i.e., only a small additional amount (in the order of decigrams) and at a very minimal cost. This pressure is not critical as long as it gives the can rigidity at room temperature and is not enough to make the end convex. The pressure can vary depending on the wall thickness, the type of product and other factors.

Since the autoclave has an external pressure which mostly overcomes the internal pressure, I design the end 20 with a concave surface 21 which will not invert at the differential pressure in the autoclave and the cooler due mostly to the internal vaporized nitrogen or carbon dioxide pressure, i.e., about 10–20 psig.in. (0.69–1.38 bar) but will invert at higher pressures generated by bacteria in the can.

FIGS. 2(b) and 2(c) show the can 22 and end 20 during autoclaving and cooling, respectively. As can be seen, the surface 21 maintains its concavity. Bacterially generated pressures are very high and, as seen in FIG. 2(d) easily overcome the resistance of the end to bulge at the 10–20 psig.in. (0.69–1.38 bar) used to pressurize the can 22. If so desired, the concavity can be made to resist bulging even if the autoclave during cooling or the cooling tunnel is not pressurized. A simplified autoclave or cooling system can, therefore, be used. Advantageously, the end 20 may include stiffening beads 23 although the invention will perform satisfactorily without such beads.

The can 22 may be a conventional thin-walled beverage type container of the type described above. As is well known, such a container has a bottom that is formed integrally with the body of the container, but may have a separately made bottom which is seamed on to the body.

The pressure used to pressurize the can gives a room temperature pressure usually 10–20 psig (0.69–1.38 bar). However, higher pressures of 30 psig or 40 psig (2.07–2.76 bar) or more can be used, if desired, since the can bottom (separate or integral) is usually designed for about 60–120 psig pressure for carbonated beverages. Since the present invention is for non-carbonated products, and the internal pressure does not have to exceed about 10–20 psig, (0.69–1.38 bar) the bottom (separate or integral) can be made thinner than even the present beverage can bottoms and in the thickness and shape that will be concave up to the maximum desired pressure and become convex at higher bacterially generated pressures. This, of course, will save additional money and save metal and improve even further the environmental benefits of this invention.

Although the invention has been described in connection with the packaging of foods which are autoclaved, its use is not so limited and it may be used with the packaging of foods which are sterilized by other processes, such as aseptic or radiation sterilization.

In aseptic sterilization, the food is sterilized by one of several processes and cooled to around ambient temperature in a sealed sterile system, the food after cooling being at atmospheric pressure. The empty cans are sterilized with superheated steam (hot air and other ways can be used to sterilize the empty can) in a tunnel which is at substantially atmospheric pressure. The ends are sterilized in a manner similar to the way the cans are sterilized. The sterilized food is pumped into the can and, as in autoclave processing, air above the food is removed with sterile steam or reheating and the end is seamed on. All this is done in a sterile tunnel at substantially atmospheric pressure. The can is then cooled. (Pressure cooling is not used since the product in the can has not been substantially reheated before cooling). Prior to seaming, liquid nitrogen or another liquid or solid inert gas (which is inherently sterile or can be sterilized) is added in the same manner as in autoclave processing, except that the can is still in the sterile tunnel. On cooling, the same sequence as in autoclave processing occurs, i.e., the pressure in the can decreases when the water vapor or injected steam condenses and this is overcome by the pressure due to the evaporating liquid nitrogen resulting in a pressure instead of a vacuum.

In radiation sterilization, the food precooked or not precooked is put in the can, liquid nitrogen or another liquid or solid inert gas is added and air is removed as in autoclave processing and the can is sealed. On cooling the same sequence occurs as in autoclave processing. The can is now exposed to radiation (cobalt 60 or another source) which sterilizes the product without heat.

For high temperature non-pressurized sterilization, the concavity(ies) of the end(s) is/are so designed as not to bulge or invert at the pressure developed due to the added gas pressure. Since pressures due to the gases formed by bacterial action are very large, the built-in concavity strength has considerable leeway. For economic and other reasons, it is made only sufficiently strong for the type of processing used.

If the can bottom (integral or seamed on) is designed so that the concavity bulges out at the desired pressure instead of the 60–120 psig (5.25–8.28 bar) used for carbonated beverages, then bacterial action will even more readily bulge or invert the bottom. If the top end is also designed accordingly then it too will bulge, so that bacterial action can be indicated by one or both ends of the can bulging, while the rigidizing added gas pressure keeps the can rigid and is not sufficient to bulge either or both ends.

There are further important advantages to a sterilized, nonrigid until pressurized food can, as opposed to a sterilized rigid food can which is under vacuum. Since the can is under pressure, a pinhole leak or a seam leak tends to leave a visible trace. This can happen in a can with a pinhole due to corrosion or damage of a seam or to tampering. The pressurizing gas will escape and, when non-sterile air is then drawn in, the gases caused by bacterial action will escape and the can will stay at atmospheric pressure and the ends will not bulge. But, since the can is made to be non-rigid at atmospheric pressure, it becomes immediately evident that it should not be used because, when it is picked up, it will feel very soft to the touch and hand compression will be very easy and will even tend to force out some contents. This effect can be easily seen by picking up a carbonated (or pressurized high acid) can and then feeling the difference in rigidity before and after opening the can. In fact, the thinner and more crushable the can is when not pressurized, the safer the product becomes.

A food can under vacuum (such as presently used sterilized cans) behaves differently when it has a hole or other leaks. Air is drawn in immediately to displace the vacuum; it is much harder for contents to leak out (i.e., no pressure pushing them out); gases due to bacterial action will not bulge the ends since there is a leak, but the can will maintain its rigidity due to the wall thickness and wall beading, if any. Wall beading is usually present in non-pressurized cans, since it makes the walls more rigid and keeps them from collapsing under vacuum and, therefore, under hand pressure.

An additional problem for a food can under vacuum is that if the seaming operation is imperfect, the vacuum in the can will draw unsterilized water into the can during the subsequent cooling operation. In contrast, a pressurized food can will, as discussed above, because of its internal pressure prevent any leakage into the can.

Cans with a wall thickness found in the presently used beverage container can be used, i.e., from about 2–5 thousands of an inch (0.05–0.127 mm) instead of the usual food can wall thickness of about 5.5–11 thousands of an inch (0.139–0.279 mm) depending somewhat on the size of the can, or if beaded or not beaded. (Some beading can be added to my can; this will not change the function of my ends.)

Such a saving in wall thickness and weight of the can, i.e., about 30%–60% or more weight savings, represents about four million metric tons of steel per year worth $2.4 billion and the concomitant saving of energy and pollution due to mining, transport and processing. The pollution consists of carbon dioxide (global warming), sulfur dioxide (acid rain) oxides of nitrogen, unburned hydrocarbons, smog, carbon monoxide, slag, waste water and other pollutants.

With 29 billion food cans manufactured in the U.S.A. and about 100 billion world wide, the savings in money, materials and pollution is very significant. Even recycling becomes more economically feasible, since a truckload of thin walled, easily crushed cans is less expensive to transport than a truckload of thick walled cans.

Although the present invention has been described in relation to particular embodiments thereof, many other variations and modifications and other uses will become apparent to those skilled in the art.

For example, although the invention has been described as being used with conventional ends, the invention is also applicable to being embodied in easy-open ends. An easy open end is an end that does not require a can opener to cut through the end or the body of the can. This is achieved by scoring parts of the end so that the end still resists pressure (from above or below) but has a lower shear resistance at the scores and can be opened at the score line with a decreased amount of force, making it possible to open it without a can opener, usually just by pulling or pushing by hand (for older people or people with arthritis a tool might be used to increase leverage). Easy open ends are made for either a partial opening for drinks or a full top opening for solid foods. Common types of easy-open ends are pull-tab ends, lever tab ends and push-in ends. An example of the invention as embodied in a pull-tab end 20' attached to a can 22' is shown in FIG. 3. Like the end 20 of FIGS. 2(*a*)–2(*d*), the end 20' has a concave surface 21' which will not become convex unless there is gas in the can 22' due to bacterial action.

Also, although the invention has been described as being used with autoclave, aseptic or radiation sterilization, the invention is not so limited and may be used with other sterilization techniques.

It is preferred, therefore, that the present invention be limited not by the specific disclosure herein, but only by the appended claims.

What is claimed is:

1. A pressurized sealed container containing sterilized edible material, which comprises:

a thin wall sealed container containing edible material sterilized in a sterilization process and an inert gas under pressure, the walls of the container being maintained rigid by the pressure of the inert gas but being easily deformable in the absence of such pressure, the container having a top end and a bottom end with at least one end having a concave slope relative to the inside of the container, the at least one end being of a material and having a thickness and shape such that said at least one end of said sealed container will retain a substantially concave slope before, during and after said sterilization process but will become convex only if there is any additional gas pressure generated due to bacterial action in the pressurized sealed container.

2. The pressurized sealed container in accordance with claim 1, wherein the sterilization process is an autoclave sterilization process.

3. The pressurized sealed container in accordance with claim 1, wherein the sterilization process is an aseptic sterilization process.

4. The pressurized sealed container in accordance with claim 1, wherein the sterilization process is a radiation sterilization process.

5. The pressurized sealed container in accordance with claim 1, wherein the container is a beverage-type container.

6. The pressurized sealed container in accordance with claim 5, wherein the container is made of metal.

7. The pressurized sealed container in accordance with claim 6, wherein the at least one end includes at least one stiffening bead.

8. The pressurized sealed container in accordance with claim 7, wherein the at least one end is an easy-open end.

9. A method of packaging sterilizable edible material, comprising:

a) inserting an edible material to be sterilized into a thin wall container having an opened and closed end, the closed end being sealed with a first closing member;

b) inserting a predetermined amount of an inert liquified or solidified gas into the container;

c) allowing the gas to vaporize;

d) before the gas has completely vaporized, sealing the open end of the container with a second closing member such that the pressure of the inert gas in the sealed container is sufficient to maintain the walls of the container rigid, which walls would otherwise be easily deformable in the absence of said inert gas; and (e) sterilizing the edible material and the container such that a pressurized sealed container containing sterilized edible material is formed; and wherein at least one of the first and second closing members has a concave slope relative to the inside of the container and is of a material and has a thickness and shape such that the at least one end of said sealed container will retain a substantially concave slope before, during and after steps (d) and (e) but will become convex only if there is any additional gas pressure generated due to bacterial action in the pressurized, sealed container.

10. A method of packaging in accordance with claim 9, wherein step (e) results in a vacuum and the amount of inert gas is sufficient to generate a pressure sufficient to balance the vacuum and to provide rigidity to the container.

11. A method of packaging in accordance with claim 10, wherein step (e) comprises autoclave sterilization which includes heating and cooling the container.

12. A method of packaging in accordance with claim 11, wherein steam is added to the container before sealing the open end thereof.

13. A method of packaging in accordance with claim 10, wherein the inert gas is solid carbon dioxide.

14. A method of packaging in accordance with claim 10, wherein the container is a beverage type container.

15. A method of packaging in accordance with claim 14, wherein the container is made of metal.

16. A method of packaging in accordance with claim 16, wherein the end includes at least one stiffening bead.

17. A method in accordance with claim 16, wherein the at least one end is an easy-open end.

18. A method of packaging in accordance with claim 9, wherein step (e) comprises aseptic sterilization which includes sterilizing the edible material and the container prior to step (a) and sterilizing the second closing member prior to step (d).

19. A method of packaging in accordance with claim 9, wherein step (e) comprises radiation sterilization which includes subjecting the container after step (d) to radiation sufficient to sterilize the edible material and the container.

20. A method of packaging in accordance with claim 9, wherein the inert gas is liquified nitrogen.

21. A method of packaging in accordance with claim 9, wherein the inert gas is liquified carbon dioxide.

* * * * *